US008682036B2

(12) United States Patent
Wang et al.

(10) Patent No.: US 8,682,036 B2
(45) Date of Patent: Mar. 25, 2014

(54) SYSTEM AND METHOD FOR STREET-PARKING-VEHICLE IDENTIFICATION THROUGH LICENSE PLATE CAPTURING (75) Inventors: Yao Rong Wang, Webster, NY (US); Zhigang Fan, Webster, NY (US); Graham S. Pennington, Webster, NY (US); Hengzhou Ding, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 148 days.

(21) Appl. No.: 13/461,191

(22) Filed: May 1, 2012

(65) Prior Publication Data

US 2013/0266190 A1    Oct. 10, 2013

Related U.S. Application Data (63) Continuation-in-part of application No. 13/441,294, filed on Apr. 6, 2012.

(51) Int. Cl.
*G06K 9/00* (2006.01)
*G08G 1/017* (2006.01)

(52) U.S. Cl.
USPC ............................ 382/105; 382/291; 340/937

(58) Field of Classification Search
CPC ...................................................... G06K 9/00
USPC ......... 382/100, 103–107, 155, 162, 168, 173, 382/181, 199, 209, 232, 254, 274, 276, 382/286–294, 305, 312; 340/932.2, 937, 340/432, 148; 348/169, 148
See application file for complete search history.

(56) References Cited

U.S. PATENT DOCUMENTS

| 6,081,206 A * | 6/2000 | Kielland ........................ 340/937 |
| 6,285,279 B1 * | 9/2001 | Yamazaki ..................... 340/432 |
| 6,285,297 B1 | 9/2001 | Ball |
| 6,747,687 B1 * | 6/2004 | Alves ............................ 348/148 |

(Continued)

FOREIGN PATENT DOCUMENTS

| JP | 2003217080 | 7/2003 |
| JP | 2007164566 | 6/2007 |
| KR | 100867336 B | 11/2008 |

OTHER PUBLICATIONS

GB Search Report, Application No. GB1305903.5, Date of Search Sep. 27, 2013.

(Continued)

*Primary Examiner* — Seyed Azarian
(74) *Attorney, Agent, or Firm* — Fay Sharpe LLP (57) ABSTRACT A method and a system for identifying a vehicle in a parking area includes receiving video data from a video camera observing a parking area from a first field of view over duration of time and receiving image data from a still camera observing a second field of view overlapping the first field of view. The method includes tracking a location of a vehicle across a sequence of frames. The tracking includes determining a time instant at which each frame was captured. The method includes comparing a select frame captured by the video camera with an image captured by the still camera. Based on the comparing, the method includes matching the vehicle in the image with the vehicle in the frame. The method includes determining a license plate number of the vehicle by locating a license plate on the vehicle in the image.

21 Claims, 3 Drawing Sheets

(56) References Cited

U.S. PATENT DOCUMENTS

| | | | |
|---|---|---|---|
| 8,120,513 B2* | 2/2012 | Ioli | 340/932.2 |
| 2003/0076417 A1* | 4/2003 | Thomas et al. | 348/169 |
| 2004/0151342 A1 | 8/2004 | Venetianer et al. | |
| 2005/0270178 A1 | 12/2005 | Ioli | |
| 2011/0064268 A1 | 3/2011 | Cobb et al. | |
| 2012/0007983 A1* | 1/2012 | Welch | 348/148 |
| 2012/0148105 A1 | 6/2012 | Burry et al. | |
| 2012/0263352 A1* | 10/2012 | Fan et al. | 382/105 |
| 2013/0028481 A1 | 1/2013 | Wu | |

OTHER PUBLICATIONS http://www.nytimes.com/2011/09/19/nyregion/uprooting-the-old-familiar-parking-meter.html?_4=1&goback+%2Egde_153603_member_72027013, Dated Sep. 18, 2011; 3 pgs.

www.streetsmarttechnology.com, retrieved from the internet Aug. 6, 2012, 10 pgs.

Wren et al., "Pfinder: Real-Time Tracking of the Human Body", in IEEE Transactions on Pattern Analysis and Machine Intelligence, Jul. 1997, vol. 19, No. 7, pp. 780-785.

Friedman et al., "Image segmentation in video sequences: A probabilistic approach", in Proc. of the Thirteenth Conference on Uncertainty in Artificial Intelligence (UAI), Aug. 1-3, 1997.

Stauffer et al., "Adaptive background mixture models for real-time tracking", in Proc. of the 1999 Conference on Computer Vision and Pattern Recognition (CVPR '99), pp. 2246-2252, 1999.

Makarov et al., "Intrusion detection using extraction of moving edges", in $12^{th}$ IAPR Int. Conf. on Pattern Recognition, vol. 1 of IAPR, pp. 804-807, IEEE Press, 1994.

Paragious et al., "Detection and location of moving objects using deterministic relaxation algorithms", in ICPR, No. 13, pp. 201-286, Vienna, Austria, Aug. 1996.

http://www.alibaba.com/product-gs/373281312/Ultrasonic_Parking_Sensor.html, retrieved from the internet Mar. 28, 2012; 4 pgs.

Oliver et al., "A Bayesian Computer Vision System for Modeling Human Interactions", IEEE Transactions on PAMI, pp. 831-843, (Mar. 28, 2000).

Lo et al., "Automatic congestion detection system for underground platforms," Proc. of 2001 Int Symp. on Intell. Multimedia, Video and Speech Processing, pp. 158-161.

Prati et al., "Shadow Detection Algorithms for Traffic Flow Analysis: a Comparative Study", In Proc. IEEE Intelligent Transportation Systems, 2001.

Cucchiara et al., "Improving Shadow Suppression in Moving Object Detection with HSV Color Information", Proc. of IEEE Intelligent Transportation Systems, 2001.

Zhang, "A flexible new technique for camera calibration", IEEE Trans. on Pattern Analysis and Machine Intelligence, vol. 22 (11), pp. 1330-1334 (2000).

http://www.nyc.gov/html/dof/html/parking/park_tickets_violations.shtml, retrieved from the internet Aug. 6, 2012.

http://www.sanjoseca.gov/transportation/onstreet_regulations.htm, retrieved from the internet Aug. 6, 2012.

http://www.portlandoregon.gov/transportation/article/59926, retrieved from the internet Aug. 6, 2012.

http://vancouver.ca/bylaws/2849c.pdf, Street and Traffic By-Law No. 2849, Oct. 18, 2011.

http://parkitnyc.com/parking-nyc/nyc-parking-tickets/, retrieved from the internet Aug. 6, 2012.

Agarwal et al., "Learning to detect objects in images via a sparse, part-based representation", Pattern Analysis and Machine Intelligence, IEEE Transactions on, vol. 26, No. 11, pp. 1475-1490, Nov. 2004.

Tsai et al., "Vehicle Detection Using Normalized Color and Edge Map," Image Processing, IEEE Transactions on, vol. 16, No. 3, pp. 850-864, Mar. 2007.

Duncan, et al., "Temporal edges: The detection of motion and the computation of optical flow", in Proc. Second Int. Conf. Comput. Vision, Tampa, FL, Dec. 1988, pp. 374-382.

Comaniciu et al., "Real-time tracking of non-rigid objects using mean shift", in: Proceedings of IEEE Conference on Computer Vision and Pattern Recognition (CVPR'00), South Carolina, 2000, pp. 142-149.

Kass et al., "Snakes: Active Contour Models", Int'l Journal of Computer Vision, pp. 321,331, 1988.

Dickmanns et al., "Dynamic monocular machine vision", Machine Vision and Applications 1: 1223-240, 1988.

Gustafsson et al., "Particle Filters for Positioning, Navigation and Tracking", IEEE Transactions on Signal Processing, 2002.

http://en.wikipedia.org/wiki/Hough_transform, "Hough transform", retrieved from the internet Aug. 6, 2012, last modified Aug. 1, 2012.

Ma et al., "Edge-based rich representation for vehicle classification", Proc. of IEEE Computer Vision (ICCV), 2005.

* cited by examiner

SYSTEM AND METHOD FOR STREET-PARKING-VEHICLE IDENTIFICATION THROUGH LICENSE PLATE CAPTURING

CROSS REFERENCE TO RELATED PATENTS AND APPLICATIONS

This application claims the priority, as a continuation-in-part, of co-pending U.S. application Ser. No. 13/441,294, filed on Apr. 6, 2012 and entitled "Video-Based Detector and Notifier For Short-Term Parking Violation Enforcement", by Edgar Bernal et al., the disclosure of which is incorporated herein by reference in its entirety.

BACKGROUND

The disclosure relates to a video-based on-street parking management system that identifies a license plate of a parked vehicle for automating the operations of monitoring parking areas and collecting parking fines and/or fees. The disclosure finds application in parking area management and enforcement. However, it is appreciated that the present exemplary embodiments are also amendable to other like applications.

Traditionally, parking management is performed by using meters that receive coin payments and display readings that correlate to a remaining time-value. However, meters are being phased out because the operation is costly in labor required for inspection and in fines lost from undetected violations.

Video-based solutions were recently proposed for monitoring parking spaces and determining parking violations. A video-based method uses a non-stereoscopic video camera that outputs a binary signal to a processor, which uses the data for determining vehicles in violation of a regulation. When a violation is detected, an alert is transmitted to an enforcement agent, who visits the scene to identify the violating vehicle and to issue a parking ticket.

Figure 1:
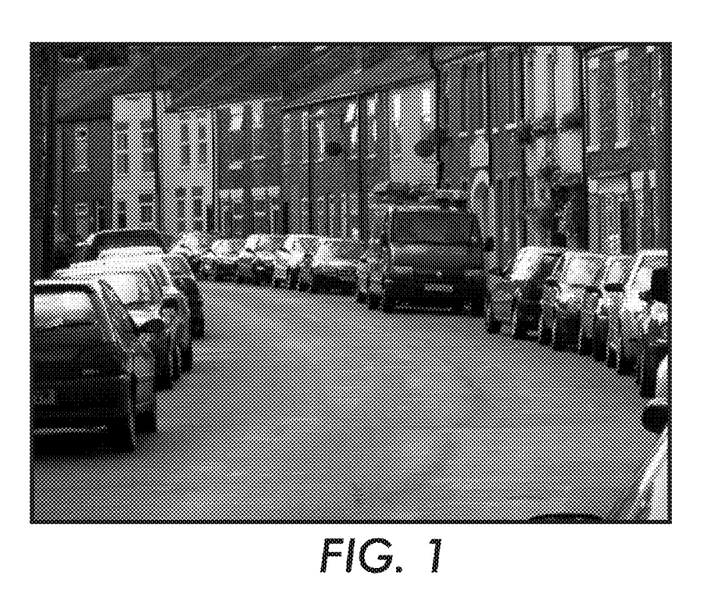
FIG. 1 shows a parking area illustrating a challenge of identifying the license plate number of a vehicle that is tightly parked.

However, with the expansion of video-based solutions, parking enforcement entities are moving away from the practice of sending enforcement agents to the parking area. Similarly, parking management entities are also moving away from the practice of employing people for collecting payment at areas that charge for parking. Therefore, the video-based system faces challenges that include enforcement against violators and collection of fees. A license plate number is needed to identify a vehicle that is violating a parking regulation or using a for-fee parking space. It can be difficult for a camera to capture license plate information from a vehicle that is tightly parked, such as, for example, in the multi-space lane shown in FIG. 1. As illustrated in the figure, an occlusion that is caused by objects and other vehicles parked in proximity to the detected vehicle can prevent the camera from capturing the license plate. In these automated systems, a violation cannot be determined without accurately identifying the vehicle.

Therefore, a fully automated system is needed for identifying a vehicle through its license plate number after determining that the vehicle is either parked in a private area or is violating a regulation. A system is desired for enabling an automatic issuance of a fine and/or charge to a registrant of the vehicle in response to the identification. A system is further desired for enabling the fine or fee to be charged to a specific account associated with the vehicle registrant.

CROSS REFERENCE TO RELATED PATENTS AND APPLICATIONS

This application is related to co-pending Application Number [Atty. Dkt. No. 20111383USCIP1], filed herewith, entitled "Smartphone Augmented Video-Based On-Street Parking Management System", by Zhigang Fan et al., the application of which is incorporated herein in its entirety.

BRIEF DESCRIPTION

Embodiments of the present disclosure relate to a method and a system for identifying a vehicle in a parking area. The method includes receiving video data in a sequence of frames provided by a video capture device observing a parking area from a first field of view over duration of time. The method further includes receiving image data from an image capture device observing the parking area from a second field of view at least partially overlapping the first field of view. The method also includes tracking a location of a vehicle across the sequence of frames. The method includes comparing a select frame captured by the video capture device with an image captured by the image capture device. Based on the comparing, the method includes matching the vehicle in the image with the vehicle in the video frame. The method includes determining a license plate number of the vehicle by locating a license plate on the vehicle in the image.

DETAILED DESCRIPTION

The disclosure relates to a video-based parking management system that identifies a license plate of a parked vehicle for automating the operations of monitoring a parking area and collecting parking fines and/or fees.

More specifically, the system includes a detection device that is adapted to receive video data transmitted from at least a first camera monitoring a parking area. The acquired video can be processed locally or transferred to a central processor where it is analyzed to detect vehicles that are parked in the parking area. The detection device is further adapted to receive image data transmitted from at least a second camera monitoring the parking area from a different position but having an overlapping field of view with the first camera. The system identifies a license plate number associated with a detected vehicle by matching the vehicle in the image with a vehicle captured in the video data at the same time instant. The system then reports the license plate number to an entity that is authorized to enforce the parking area, or alternatively it can charge an account associated with a registrant of the vehicle.

Figure 2:
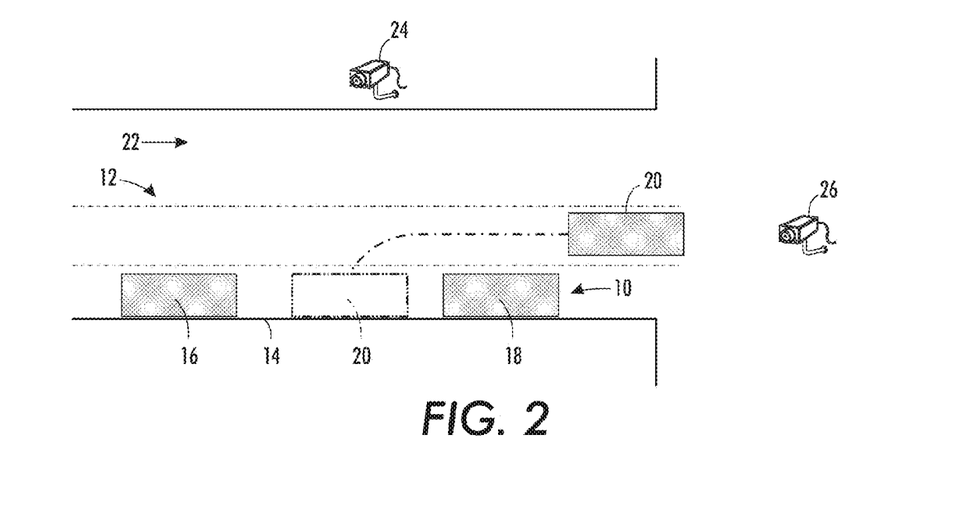
FIG. 2 shows an example scenario of a system for identifying a vehicle license number.

FIG. 2 shows an example scenario of a system for identifying a vehicle license plate number. An on-street parking area 10 extends along a curb 14 on a street 12. The parking area 10 is more specifically a parking lane. Two vehicles 16, 18 are parked in the parking area 10. A third vehicle 20 is shown moving into the parking area from a lane 22 that is designated for moving traffic. A video camera 24 is installed in a first location for continuously monitoring the parking area 10 from across the street. The video data provided by the video camera 24 is used to detect the vehicles 16, 18, 20 in the parking area 10. A second camera 26 is installed in a different location for monitoring the traffic on street 12 from down the street. The second camera 26 is adapted to capture an image of the third vehicle 20 when it is moving into the parking area 10. The cameras 24, 26 provide video and image data to a processor of the system, which analyzes the data and time fields associated with the data for identifying the license plate of the vehicle.

Figure 4:
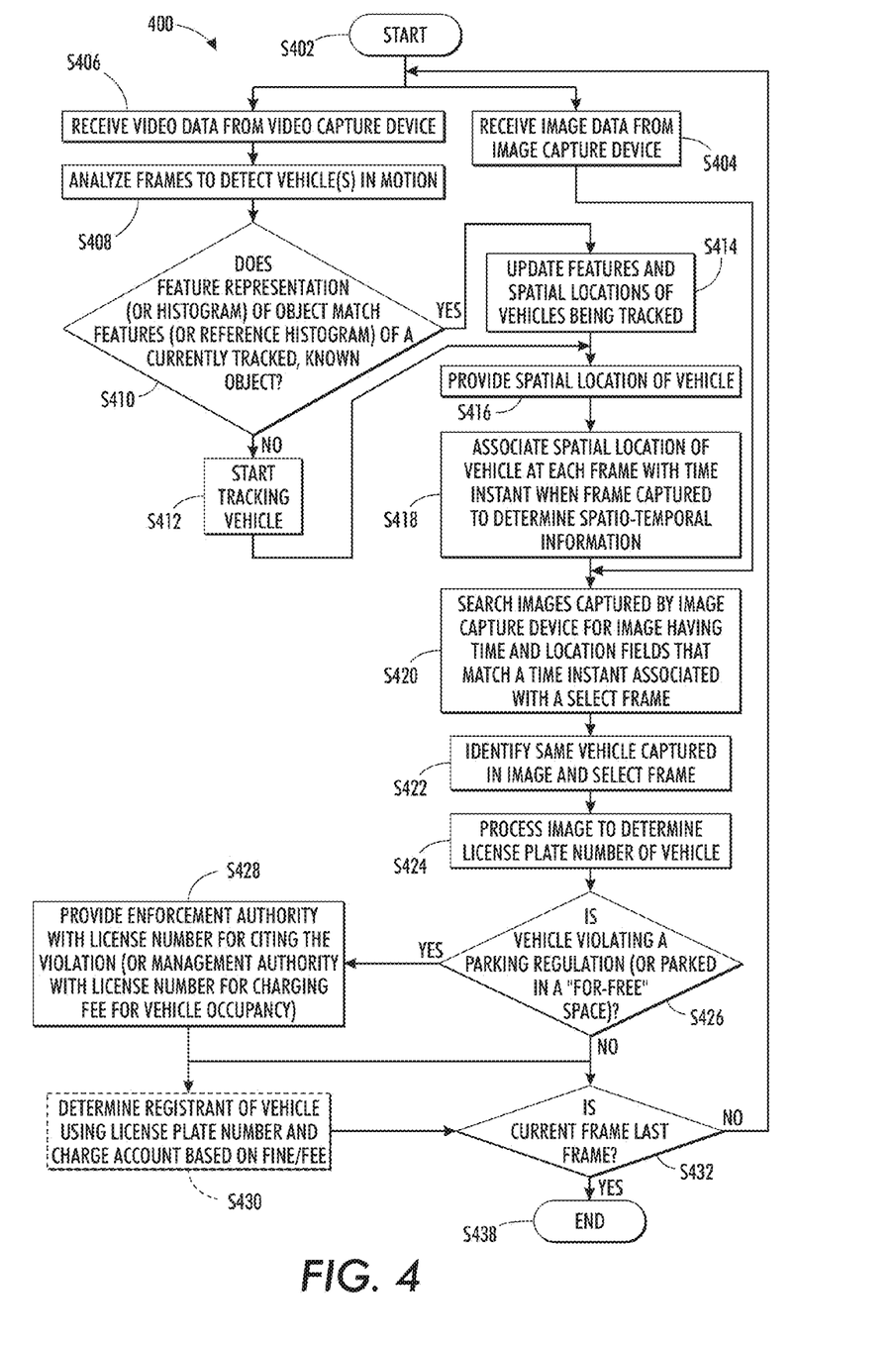
FIG. 4 is a flowchart describing a method for determining a license plate number on a moving vehicle detected in a video sequence.

FIG. 2 also shows another example scenario of a system for identifying a vehicle license number. The third vehicle 20 is shown first parking in the parking area 10. It then leaves and pull out into the street 12 appearing at the view field of the second camera 26. While the flow chart in FIG. 4 illustrates the example scenario in [0007], a skillful person in the arts can easily extend it to the scenario described in this paragraph.

While FIG. 2 illustrates the example scenario as including an on-street parking area, there is no limitation made to an application of the concepts discussed in the disclosure. For example, the system can be used to identify a license plate number of a vehicle parked in a different area, such as a parking lot.

Figure 3:
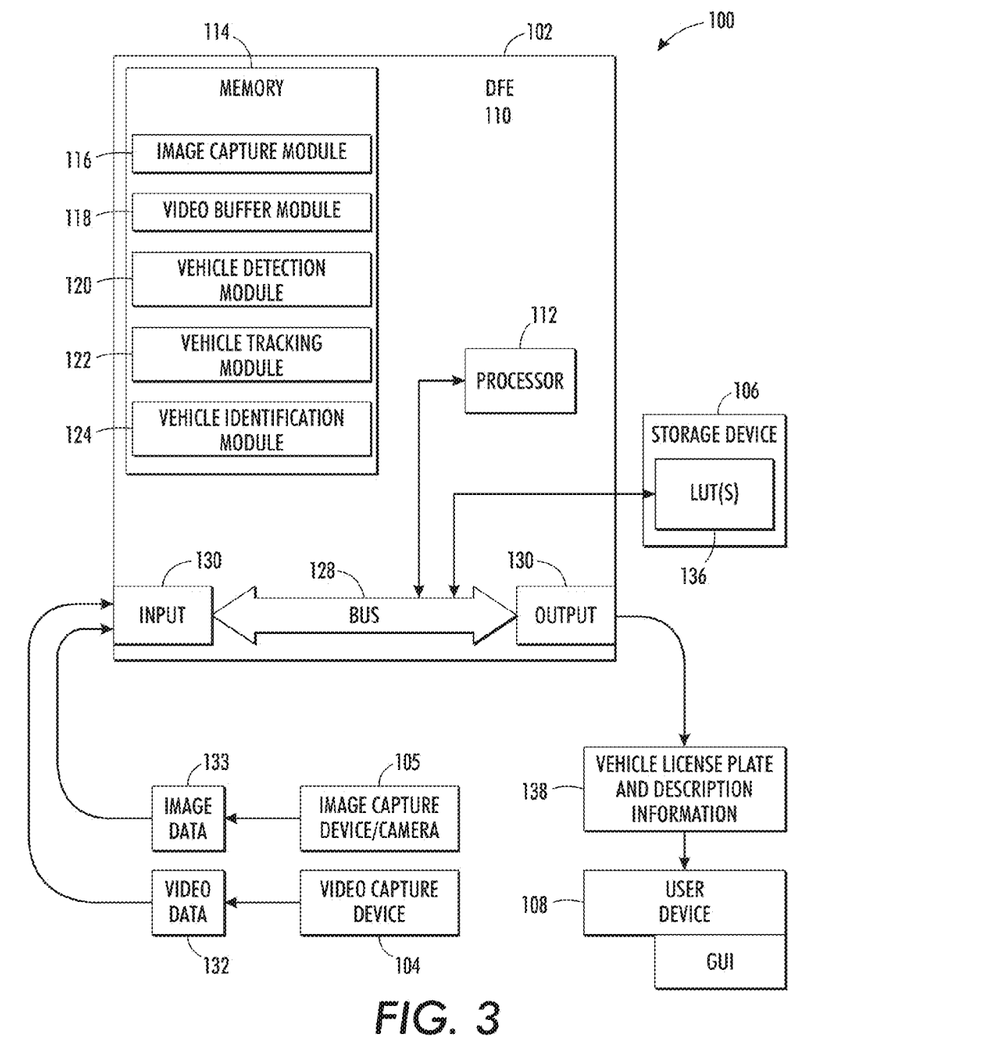
FIG. 3 is a schematic illustration of a street-parking-vehicle identification system according to one embodiment.

FIG. 3 is a schematic illustration of a parking management system 100 in one exemplary embodiment. The system includes a detection device 102, at least a first video capture device 104, at least a second image capture device 105, a storage device 106, and a user device 108, which may be linked together by communication links, referred to herein as a network. These components are described in greater detail below.

The detection device 102 illustrated in FIG. 3 includes a controller 110 that is part of or associated with the detection device 102. The exemplary controller 110 is adapted for controlling an analysis of video and image data received by the system 100. The controller 110 includes a processor 112, which controls the overall operation of the detection device 102 by execution of processing instructions that are stored in memory 114 connected to the processor 112.

The memory 114 may represent any type of tangible computer readable medium such as random access memory (RAM), read only memory (ROM), magnetic disk or tape, optical disk, flash memory, or holographic memory. In one embodiment, the memory 114 comprises a combination of random access memory and read only memory. The digital processor 112 can be variously embodied, such as by a single-core processor, a dual-core processor (or more generally by a multiple-core processor), a digital processor and cooperating math coprocessor, a digital controller, or the like. The digital processor, in addition to controlling the operation of the detection device 102, executes instructions stored in memory 114 for performing the parts of the method outlined in FIG. 4. In some embodiments, the processor 112 and memory 114 may be combined in a single chip.

The detection device 102 may be embodied in a networked device, such as the image capture device 104, although it is also contemplated that the detection device 102 may be located elsewhere on a network to which the system 100 is connected, such as on a central server, a networked computer, or the like, or distributed throughout the network or otherwise accessible thereto. The vehicle detection and license identification phases disclosed herein are performed by the processor 112 according to the instructions contained in the memory 114. In particular, the memory 114 stores an image buffer module 116, which identifies license plate numbers associated with vehicles captured in images received for a region proximate the select parking area; a video buffer module 118, which captures video of a select parking area; a vehicle detection module 120, which detects objects and/or vehicles within a field of view of the camera; a vehicle tracking module 122, which tracks the vehicles that were detected by the vehicle detection module 118, and a vehicle identification module 124, which matches the image captured by the image capture module with a detected vehicle and uses the match to determine the license plate number of the detected vehicle. Embodiments are contemplated wherein these instructions can be stored in a single module or as multiple modules embodied in the different devices. The modules 116-124 will be later described with reference to the exemplary method.

The software modules as used herein, are intended to encompass any collection or set of instructions executable by the detection device 102 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server (not shown) or other location to perform certain functions. The various components of the detection device 102 may be all connected by a bus 128.

With continued reference to FIG. 3, the detection device 102 also includes one or more communication interfaces 130, such as network interfaces, for communicating with external devices. The communication interfaces 130 may include, for example, a modem, a router, a cable, and/or Ethernet port, etc. The communication interfaces 130 are adapted to receive video and/or image data 132 as input.

The detection device 102 may include one or more special purpose or general purpose computing devices, such as a server computer or digital front end (DFE), or any other computing device capable of executing instructions for performing the exemplary method.

FIG. 3 further illustrates the detection device 102 connected to a least one video source 104 for inputting and/or receiving the video data 132 in electronic format. The video source 104 may include a video capture device, such as a camera. The video source 104 can include one or more surveillance cameras that capture video data from the parking area of interest. The number of cameras may vary depending on a length and location of the area being monitored. It is contemplated that the combined field of view of multiple cameras typically comprehends all parking spaces in the parking area. For performing the method at night in parking areas without external sources of illumination, the cameras 104 can include near infrared (NIR) capabilities at the low-end portion of a near-infrared spectrum (700 nm-1000 nm).

FIG. 3 further illustrates the detection device 102 connected to a least one image source 105 for inputting and/or receiving image data 133 in electronic format. The image source 104 may include an image capture device, such as a camera that captures still images from the parking area of interest or a region proximate the parking area. The number of cameras may vary depending on a length and location of the area being monitored. It is contemplated that the field of view typically (and at least partially) overlaps that of the video source 104. For performing the method at night in areas without external sources of illumination, the cameras 105 can also include near infrared (NIR) capabilities.

In one embodiment, the video and image sources 104, 105 can be devices adapted to relay and/or transmit the data captured by the cameras to the detection device 102. In another embodiment, the video and image data 132, 133 may be input from any suitable source, such as a workstation, a database, and a memory storage device, such as a disk, or the like. The video and image sources 104, 105 are in communication with the controller 110 containing the processor 112 and memories 114.

With continued reference to FIG. 3, the system 100 includes a storage device 106 that is part of or in communication with the detection device 102. In a contemplated embodiment, the detection device 102 can be in communication with a server (not shown) that includes a processing device and memory, such as storage device 106, or has access to a storage device 106, for storing look-up tables (LUTs) that associates maximum allowable parking times for particular parking spaces. The storage device 106 includes a repository, which stores at least one (previously generated) look-up-table (LUT) 136 for each particular camera used by the system 100. The storage device can also include a LUT that associates account information associated with a vehicle registrant that previously registered with the system.

With continued reference to FIG. 3, the system includes a user device 108 in communication with the detection device 102. The user device 108 can include a computer belonging to an authorized enforcement entity or a registrant of the vehicle. The user device 108 includes a graphic user interface (GUI) 140, which receives information input by the user. The GUI can include an input device, such as a keyboard or touch or writable screen, for receiving instructions and user and/or vehicle information as input, and/or a cursor control device, such as a mouse, trackball, or the like, for communicating user input information and command selections. The GUI can further include a display for displaying information, such as a vehicle license plate number and/or vehicle registrant information.

With reference to FIG. 4, a flowchart describes a method 400 for determining a license number on a moving vehicle that is detected in a video sequence. The method starts at S402. An image capture module 116 receives image data from a sequence of frames taken from at least one image capture device 105 monitoring a parking area or a region proximate the parking area at S404. The at least one image capture device 105 is positioned to view up and/or down a street and, hence, the front and/or rear of vehicles containing the bumper region is observable in the camera field of view. Generally, the image capture device 105 is adapted to monitor at least a section of or proximate to the parking area and capture images of vehicles in the area. Accordingly, the image capture module 116 transmits the image data to the vehicle detection module 120.

A video buffering module 118 also receives video data from a sequence of frames taken from at least one video capture device 104 monitoring a parking area at S406. The at least one video capture device 104 is positioned along the street. A side of the street, and hence a side of the parking area, is observable in the camera field of view. Generally, the video capture device 104 is adapted to monitor at least a section of the parking area, detect a vehicle moving into the parking area, and track the vehicle as it moves away from the parking area. Accordingly, the video buffering module 118 transmits the video data to the vehicle detection module 120.

Generally, the vehicle detection module 120 detects objects in motion in each frame of the sequence at S408. The pixels belonging to the stationary background construct are removed to identify moving objects in the foreground of a static image. Pixels belonging to the foreground object can undergo further processing to determine if the object is a vehicle or a non-vehicle.

Several processes are contemplated for determining the presence of objects in motion in the foreground of a static background. One embodiment is contemplated for a video feed having no foreground objects in the static image captured in the first frame. In other words, a foreground image is absent in a first frame. The background is initialized as a reference (or known) background in the first frame. In this scenario, the module 120 compares the background in each frame/image of the video sequence with the reference background. The comparison includes determining an absolute color and/or intensity difference between pixels at corresponding locations in the reference background and the current background. The difference is compared to a threshold. Generally, a small difference is indicative that there is no change in the backgrounds. A large difference for a pixel (or group of pixels) between the first frame and a respective frame is indicative that a foreground object/vehicle has entered the scene in the respective frame. In response to the difference not meeting the threshold, the pixel is classified as belonging to a background image in the current frame. In response to the difference meeting the threshold, the pixel is classified as belonging to a foreground image in the current frame. This process is contemplated for environments having constant lighting conditions.

In another contemplated embodiment, a temporal difference process is contemplated for environments with variable lighting conditions, such as the outdoor video camera of the disclosure, or in sequences having a foreground image in the first frame. Generally, subsequent (i.e., current) images are subtracted from an initial frame or a preceding frame. The difference image is compared to a threshold. Results of the threshold yield a region of change. More specifically, adjacent frames in a video sequence are compared. The absolute difference is determined between pixels at corresponding locations in the adjacent frames. In other words, the process described above is repeated for each pair of adjacent frames.

In yet another embodiment, the background can be determined by averaging a number of frames over a specified period of time. There is no limitation made herein to a process that can be used for detecting a vehicle in motion. One process includes calculating a temporal histogram of pixel values within the set of video frames that are being considered for each pixel. The most frequent pixel value can be considered a background value. Clustering processes can be applied around this value to determine the boundaries between background and foreground values.

One aspect of comparing frames by the present vehicle detection module 120 is that it determines changes in the movement status of an object and/or vehicle across the sequence. The module 120 is used to detect continuously moving objects. Furthermore, morphological operations can be used along with the temporal difference process in the discussed embodiment. A morphological process that is understood in the art can be applied to the difference images to filter out sources of fictitious motion and to accurately detect the vehicles in motion.

In summary, the vehicle detection module 120 detects the continuous movement of vehicles across frames by comparing frames. Differences between pixels at corresponding locations between frames that exceed predetermined thresholds are indicative of object movement. However, once the object stops, the difference between pixels at corresponding locations in subsequent frames becomes small. In this instance, the video detection module 120 determines that no moving object is detected in the current frame. In response to no moving object being detected, the vehicle tracking module 122 determines whether any vehicles detected in previous frames are still being tracked.

With continued reference to FIG. 4, the vehicle tracking module 122 tracks the moving foreground object as it moves across different frames of the video feed. This module is also capable of continuing tracking even when the vehicle becomes stationary and is thus no longer part of the moving foreground. Several processes are contemplated for tracking the object. In one embodiment, the module 122 receives a determination that a foreground object and/or vehicle ("original object") is detected at S408 in a certain frame from the vehicle detection module 120. The frame can be analyzed to determine a location of the original foreground object and appearance (e.g. color, texture and shape) characteristics of the foreground object. The extraction of the appearance characteristics of an object is performed via a feature representation of the object.

A region proximate and containing the object location is identified in the frame. Using the location information, pixels at corresponding locations of the region are tracked across multiple frames. The appearance characteristics and the location information of the object are compared to that of currently tracked and/or known objects that are identified in the corresponding regions of the other frames via a feature matching process at S410, which establishes a correspondence between the different feature representations of the objects across frames. The object in the current frame, including characteristics that match a reference object (YES at S410), are associated as being a vehicle that is currently being tracked. Accordingly, the features and spatial location information of the vehicle being tracked are updated for the current frame at S414. However, in response to the object in the current frame not having matching characteristics to a reference object (NO at S410), the vehicle tracking module determines that the object is a new object. A verification algorithm is performed to verify that the object is in-fact a new vehicle. Tracking of the vehicle can begin at S412.

Other processes are also contemplated for tracking the vehicle. There is no limitation made herein to the type of process used. Processes known in the art, such as, Optical Flow, Mean-Shift Tracking, KLT tracking, Contour Tracking, and Kalman and Particle Filtering can be employed.

In another embodiment of the present disclosure, the vehicle tracking module 122 can apply a mean-shift tracking algorithm to track vehicles that move across the camera field of view. The algorithm is based on feature representations of objects that contain characteristics that can be represented in histogram form, such as color and texture. For example, when color is being used as a feature, the feature matching stage of the algorithm maximizes similarities in colors that are present in a number of frames to track the foreground object and/or vehicle across the frames. More specifically, module 122 generates a feature histogram of an object in a given frame. The histogram relates to the appearance of a region in a first (i.e., reference) frame. The region can include an n×n pixel cell contained in the detected foreground object. In other words, the region can include a portion of the detected foreground object. This histogram becomes the reference histogram.

More specifically, the reference histogram graphically represents the number of pixels in the cell that are associated with certain color and/or intensity values. The histogram feature representation of the object/vehicle is determined to be the color distribution of pixels located in the region associated with the object/vehicle.

Multiple locations are identified in the neighborhood of the region described in which the reference histogram is computed. This is because it is expected for vehicles to have a smooth motion pattern, in other words, for locations of a given vehicle in adjacent frames to be in relatively close proximity. For subsequent frames, such as the current frame, histograms are computed for corresponding ones of the multiple possible locations where the vehicle could be located. These histograms are compared to the reference histogram at S410. The pixel region in the current frame having the histogram that best matches the reference histogram is determined to be a new location of a vehicle that is already being tracked (YES at S410). This determined region is associated as an updated location where the foreground object and/or vehicle has moved to in the subsequent frame at S414. Again, in response to the object in the current frame not having a pixel region that matches the reference histogram and possible locations of a vehicle being tracked (NO at S410), the vehicle tracking module determines that the object is a new object. A verification algorithm can be performed to verify that the object is in-fact a new vehicle. The vehicle tracking module 122 uses this information to start tracking the vehicle at S412.

In summary, the vehicle tracking module 122 tracks the motion of the foreground object and/or vehicle across subsequent frames by searching for the best matching feature histogram or target histogram among a group of candidates within a neighborhood of the initial location of the reference histogram. One aspect of tracking using this process is that the mean-shift tracking algorithm based on color features is generally robust to partial occlusions, motion blur and changes in relative position between the object and the camera.

With continued reference to FIG. 4, the vehicle tracking module 122 provides the vehicle identification module 124 with a spatial location (in pixel coordinates) of each foreground object and/or vehicle being monitored at every processed frame at S416. The vehicle identification module 124 uses this information to monitor the time instants when tracked vehicles, while initially in motion, become stationary or when vehicles, while initially stationary, start moving.

In response to a foreground object and/or vehicle becoming stationary after a period of initial movement, the system determines that the foreground object is a parked vehicle. The vehicle is determined as being stationary for consecutive frames having substantially matching features at relatively constant locations in space. Similarly, in response to a foreground object and/or vehicle becoming active after a period of being stationary in the parking area, the system determines that the foreground object is a vehicle moving away from a parking space.

One aspect of the tracking module 122 disclosed herein is that it updates locations of detected objects after every video frame at S414, which can include several updates per second. The vehicle identification module 124 uses this information to determine the time instants that the vehicle is in the parking area and surrounding region. Generally, the module 124 determines spatio-temporal information describing the location of the vehicle as a function of time. The module 124 determines the spatio-temporal information by associating the spatial location of the vehicle at each frame with a time instant at which the frame was captured at S418.

More specifically, the module 124 generates data that relates, for the sequence of frames, the pixel coordinates (output at S416) of the vehicle as a function of time. The location of the vehicle can be plotted as it traverses a scene. Using the data, the module 124 determines a time instant when the vehicle initially becomes stationary. In the data plot, this frame is indicated at the point where the plot levels off. The module 124 determines the period when the vehicle remains stationary/parked in the scene. The time instants that the vehicle remains parked is represented by the points in the plot that remain approximately level. Accordingly, the time instant at which the vehicle starts traversing the scene again, such as after a period of being stationary in the parking area, is indicated at a point where the plot starts to climb or fall, i.e., when it is no longer level. In the data plot, this frame indicates the time instant when the vehicle starts moving away from the parking area. All time instants are determined by analyzing the plot that is generated at S418.

In one embodiment, the spatio-location information that is used by the vehicle identification module 124 can undergo a filtering process before the module measures the time. The filtering can be used to reduce noise, cancel out inexistent motion, and prevent erroneous results. The results can further undergo a verification process to determine its accuracy.

The vehicle identification module 124 uses the identified time instants to determine the vehicle license plate number. Namely, the module 124 searches for images captured by the image capture device 105 that includes time and location fields that match the time instant and the monitored area of the select frame at S420. Generally, the video data and the image data provided by the video and image capture cameras 104, 105 are utilized in combination to correctly associate the captured license plates with the detected parking and/or parked vehicles.

More specifically, the module 124 searches for the image capture device 105 that is positioned in a same region as the video capture device 104 for comparing the location fields. Because the two cameras 104, 105 are installed to observe at least a partial overlap in the respective fields of view, the video and image captured by the respective cameras should include the same vehicle. The module 124 can refer to an LUT stored in a storage device 106 for associating a location of the video camera 104 with an image capture device 105 that observes the same location. For example, multiple cameras can be deployed when an on-street parking area is too long for one video capture device 104 to cover. Each camera's field of view can be overlapped with neighboring cameras so that time and location information can be subsequently carried from one camera to another. This information is associated to an image capture device 105 in the LUT for identifying the vehicle.

Once the image capture device is determined, the module 124 searches for time fields that match between the video data and the image data. More specifically, the module 124 uses the time instant that is obtained from the plot formed with the spatio-temporal information at S418 and searches for images captured by the image capture device 105 at approximately the same time instant and/or within the same time period.

The vehicle identification module 124 uses the image and the frame captured at the same time instant from cameras 104,105 including matching location fields to establish a correspondence of a vehicle captured between the image and frame. Simply put, the module 124 identifies the vehicle as being the same vehicle in both the frame and image at S422.

The vehicle identification module 124 processes the select image to determine a license plate number associated with the vehicle at S424. Generally, the image capture device 105 is positioned to capture images of vehicles in the front and rear bumper region. The system can locate a license plate in the image and use optical character recognition (OCR) combined with a segmentation process, understood in the art to determine the license plate number.

The vehicle identification module 124 uses the information provided by the vehicle detection module 120 and the vehicle tracking module 122 to determine whether the vehicle is violating a parking regulation at S426. For example, the module 102 can determine that the vehicle violates a short-term parking regulation by remaining parked in the parking area for a duration that exceeds a regulated period. This duration can be obtained from analyzing the points on the plot that remain level using the spatio-temporal information and then comparing the duration to a predetermined time threshold. This example, however, is not limiting. Other examples can include the analysis of frames for determining exclusion zone violations, parallel parking violations, and double parking violations.

In another embodiment, the vehicle identification module 124 can use the information provided by the vehicle detection module 120, which indicates vehicle occupancy in a 'for-fee' parking space. This 'for-fee' space can be managed, for example, by a private management company that charges for parking based on predetermined time intervals. For example, the 'for-fee' space can include a private parking garage that charges rates based on the number of hours that the vehicle is parked in the garage. The module 124 can receive the information provided by the vehicle tracking module 122 and use this information for determining the duration that the vehicle is occupying a space in the 'for-fee' parking area at S426.

In response to the vehicle violating the parking (YES at S426), the module 124 triggers a notification to an enforcement authority at S428. Similarly, in response to the vehicle occupying a 'for-fee' parking space (YES at S426), the module 124 triggers a notification to management authority at S428. The notification can be provided to a user device 104 indicating that the vehicle is violating a parking regulation or parking in a for-fee space. Once the violation is detected, the vehicle license number information (obtained at S424) can be sent to entities authorized to take action, such as law enforcement, for issuing a ticket to the registrant of the vehicle (such as, for example, through mail). Other information can indicate the location of the parking space, and the vehicle description, including the vehicle type, brand, model, and color, etc. The entities can use the license plate number to search a database for a registrant of the vehicle. In another embodiment, the system can optionally perform the operation of associating the license plate number with a registrant at S430. In one embodiment, the information can be transmitted to the user-device of an enforcement officer for a municipality that subscribes to the service and/or is determined via GPS data to be within a region proximate the parking area. In another embodiment, the information can be transmitted in response to a user-device 104 querying the system for the information, such as a server managing account information of the registrant. The system can be adapted to deduct the amount of the fine or the parking fee from the account of the registrant. In this configuration, a vehicle owner can pay the exact parking fee and does not need to worry about expiration of parking time.

In response to the vehicle not violating a regulation or occupying a 'for-fee' parking space (NO at S426), the system determines whether the current frame is the last frame in the sequence at S432. In response to the current frame not being the last frame (NO at S432), the process repeats starting at S402. In response to the current frame being the last frame (YES at S432), the method ends at 434.

Although the control method 400 is illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 100, wherein the disclosure is not limited to the specific applications and embodiments illustrated and described herein.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for identifying a vehicle in a parking area, the method comprising:
   receiving video data in a sequence of frames provided by an associated video capture device observing a parking area from a first field of view over a duration of time;
   receiving image data from an associated image capture device observing the street traffic from a second field of view at least partially overlapping the first field of view;
   determining a presence of a vehicle in the parking area by identifying an object in motion in the video data;
   tracking a location of a vehicle across the sequence of frames, wherein the tracking;
   comparing a select frame captured by the associated video capture device with an image captured by the associated image capture device;
   based on the comparing, matching the vehicle in the image with the vehicle in the frame; and,
   determining a license plate number of the vehicle by locating a license plate on the vehicle in the image.

2. The method in claim 1, where in the associated image capture device is a video capturing device.

3. The method of claim 1, wherein the tracking includes:
   determining a spatial location of the vehicle in a plurality of frames; and,
   determining spatio-temporal information describing the location of the vehicle as a function of time by associating the spatial location of the vehicle across the plurality of frames with a time instant at which each frame of the plurality of frames was captured.

4. The method of claim 1, wherein the determining the presence of the vehicle is performed by one of background subtraction, temporal difference, optical flow and an initialization process.

5. The method of claim 1, wherein the comparing includes:
   comparing the frame corresponding to a select time instant with an image captured at the same time instant.

6. The method of claim 5, wherein the comparing includes:
   determining spatio-temporal information describing the location of the vehicle as a function of time by associating the spatial location of the vehicle across the plurality of frames with the time instant at which the frame was captured
   determining a change in the spatio-temporal information; and,
   associating a time corresponding to the change as the select time instant.

7. The method of claim 1, wherein the matching includes:
   matching location fields of the associated video capture device and the associated image capture device.

8. The method of claim 1 further comprising:
   providing the license plate number to an associated user device.

9. The method of claim 8, wherein the user device is associated with one of a violation enforcement authority and a for-fee parking collection authority.

10. The method of claim 1 further comprising:
    determining whether the vehicle is violating a parking regulation; and,
    providing a user device with the license plate number in response to the vehicle violating the parking regulation.

11. The method of claim 1 further comprising:
    determining whether the vehicle is parking in a for-fee parking area;
    determining a registrant of the vehicle using the license plate number; and,
    charging an account of the registrant in response to the vehicle parking in the for-fee parking area.

12. A computer program product comprising tangible media which encodes instructions for performing the method of claim 1.

13. A system for determining a parking violation comprising:
    a detection device comprising memory which stores instructions for performing the method of claim 1 and a processor, in communication with the memory for executing the instructions.

14. A system for identifying a vehicle in a parking area, the system comprising:
    a video buffer module adapted to receive video data in a sequence of frames provided by an associated video capture device observing a parking area from a first field of view over a duration of time;
    an image buffer module adapted to receive image data from an associated image capture device observing the parking area from a second field of view at least partially overlapping the first field of view;
    a vehicle detection module adapted to determine a presence of a vehicle captured by identifying an object in motion in the video data;
    a vehicle tracking module adapted to track a location of the vehicle across the sequence of frames; and,
    a vehicle identification module adapted to:
    compare a select frame captured by the associated video capture device with an image captured by the associated image capture device,
    match the vehicle in the image with the vehicle in the frame, and
    determine a license plate number of the vehicle by locating a license plate on the vehicle in the image,
    a processor adapted to implement the modules.

15. The system according to claim 14, wherein the vehicle tracking module is adapted to:
    determine a spatial location of the vehicle in a plurality of frames; and,
    determine spatio-temporal information describing the location of the vehicle as a function of time by associating the spatial location of the vehicle across the plurality of frames with a time instant at which each frame of the plurality of frames was captured.

16. The system according to claim 15, wherein the vehicle identification module is adapted to:
use the spatio-temporal information to determine a duration that the vehicle is stationary; and,
provide the license plate number to an associated user device in response to the vehicle being stationary for a period meeting or exceeding a threshold.

17. The system of claim 14, wherein the vehicle detection module determines the presence of the vehicle by one of background subtraction, temporal difference, optical flow and an initialization process.

18. The system according to claim 14, wherein the vehicle identification module is adapted to:
compare the frame corresponding to a select time instant with an image captured at the same time instant.

19. The system according to claim 18, wherein the vehicle identification module is adapted to:
determine spatio-temporal information describing the location of the vehicle as a function of time by associating the spatial location of the vehicle across the plurality of frames with the time instant at which the frame was captured
determine a change in the spatio-temporal information; and,
associate a time corresponding the change as the select time instant.

20. The system according to claim 14, wherein the vehicle identification module is adapted to:
provide the license plate number to an associated user device.

21. The system according to claim 20, wherein the user device is associated with one of a violation enforcement authority and a for-fee parking collection authority.

* * * * *